June 12, 1951  H. L. ARMSTRONG  2,556,409
BALED HAY LOADER
Filed Feb. 25, 1946  3 Sheets-Sheet 1
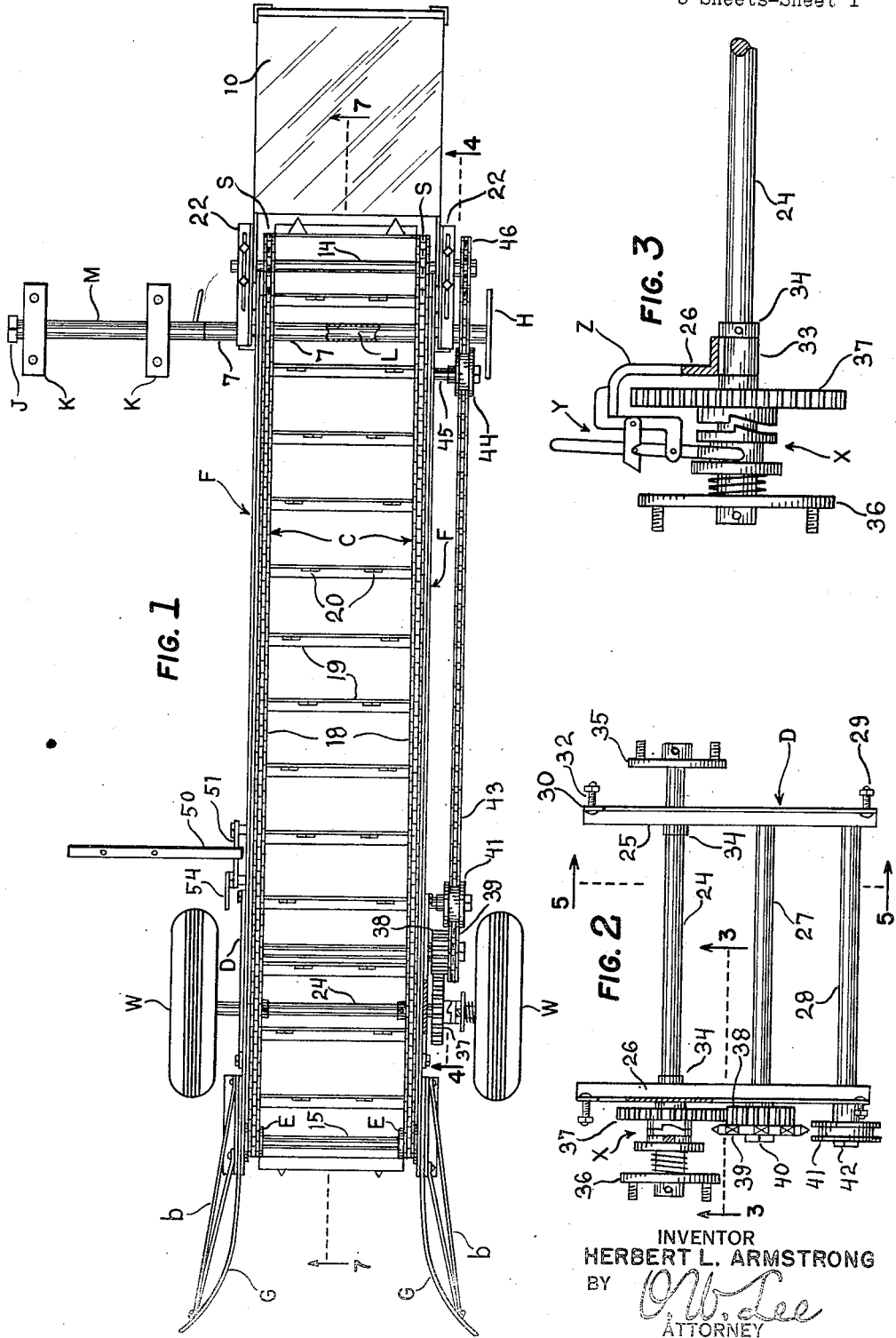
INVENTOR
HERBERT L. ARMSTRONG
BY O. W. Lee
ATTORNEY

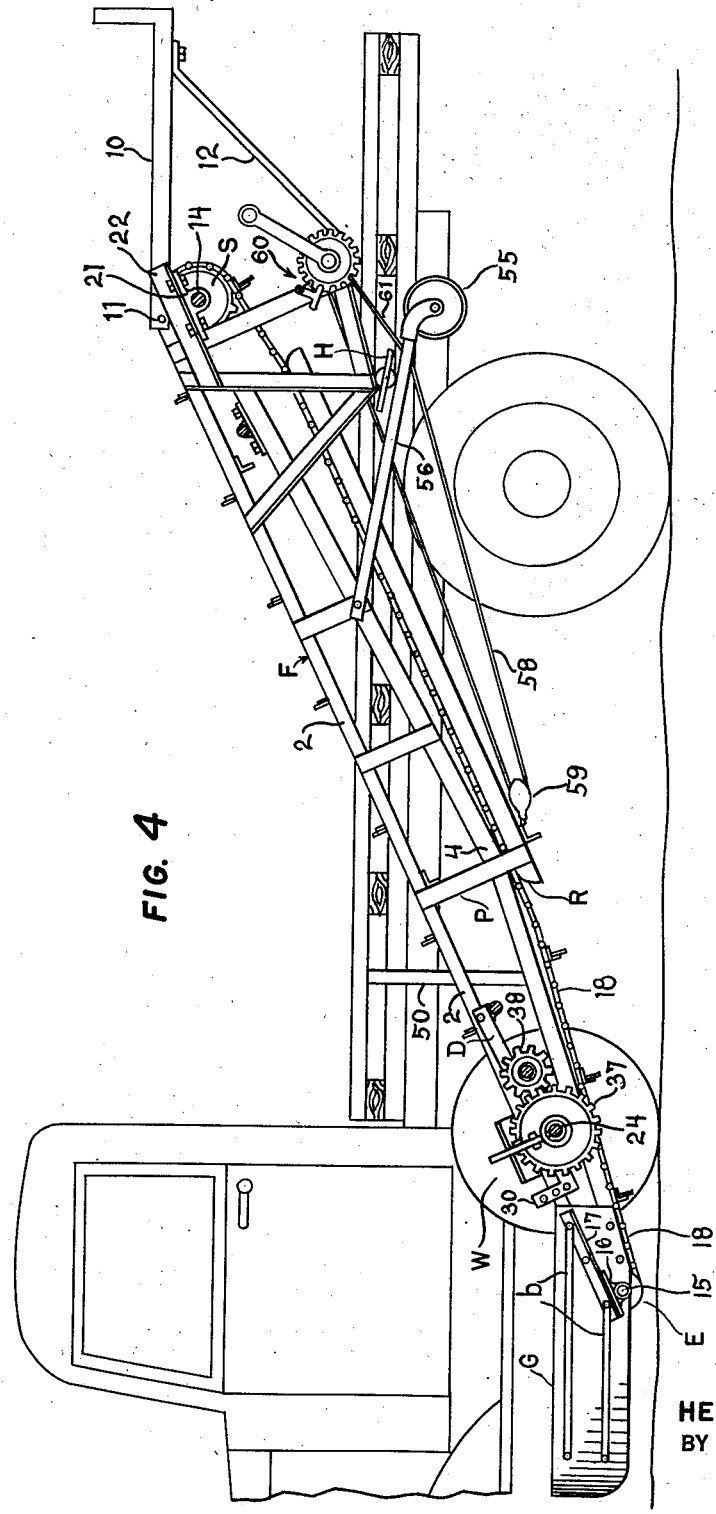

June 12, 1951 H. L. ARMSTRONG 2,556,409
BALED HAY LOADER
Filed Feb. 25, 1946 3 Sheets-Sheet 3
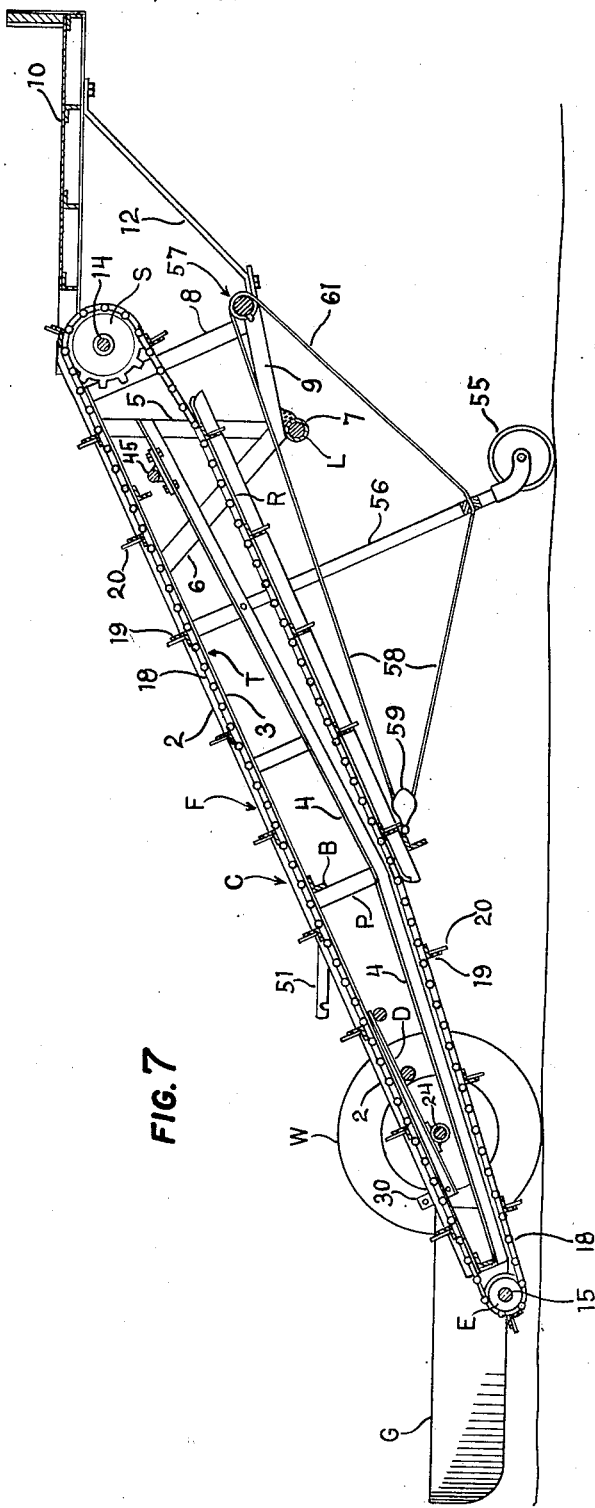
INVENTOR
HERBERT L. ARMSTRONG
BY O. W. Lee
ATTORNEY Patented June 12, 1951

2,556,409

UNITED STATES PATENT OFFICE 2,556,409

BALED HAY LOADER

Herbert L. Armstrong, Harrington, Wash.

Application February 25, 1946, Serial No. 649,900

5 Claims. (Cl. 214—42)

The present invention relates to certain new and useful improvements in a baled hay loader and provides means for individually picking up bales of hay off the ground and elevating them to a convenient height for loading onto a truck.

It has become widespread general practice to cut and bale hay and straw in the field where it is grown. The baling machine travels through the field and bales the crop, the individual bales being dropped along the path of travel. This practice is highly desirable, as it is much more economical to haul the baled hay away from the field than to haul the loose hay to a baling machine.

The baled hay loader of my invention includes means for detachably connecting it at the side of the truck used to haul the baled hay. The loader travels along with the truck so as to individually pick up the bales and elevate them for loading onto the truck. When the truck is loaded, the loader can readily be detached, so that the loaded truck can make the trip out of the field, leaving the loader there for use by a second truck while the first is making the haul.

The invention saves the time and labor which would otherwise be required to manually pick up each bale and lift it up to the height of the truck.

The invention is essentially an inclined conveyor having means for detachably pivoting its rear end to a platform type of automobile truck. The conveyor is driven by a pair of ground wheels which support its forward end and which is slidably connected to a guide bracket extending downwardly from the platform of the truck, so as to accommodate irregularities in the path of travel.

Fig. 1 is a plan view of the invention.

Fig. 2 shows an enlarged detail of the drive gear frame, separated from the loading mechanism.

Fig. 3 shows an enlarged detail looking in the direction of the arrows 3—3 of Fig. 2.

Fig. 4 shows the invention attached to an automobile truck, parts being broken away along the line 4—4 of Fig. 1 and also includes a caster wheel support shown in the retracted position.

Fig. 5 is a section taken along the line 5—5 of Fig. 2.

Fig. 6 shows an enlarged sectional detail of the means for attaching the rear end of the invention to an automobile truck.

Fig. 7 is a vertical section of the invention, as at line 7—7 of Fig. 1, and shows the caster wheel support in its active position.

Fig. 8 shows an enlarged detail of the latch used with the bracket of Fig. 10.

Fig. 9 is a section taken along the line 9—9 of Fig. 8.

Fig. 10 shows the bracket used to slidably connect the forward end of the invention to an automobile truck.

The frame of the invention consists of a pair of laterally spaced truss frames F, each of which has an upper rail 2 of angle iron with its flange 3 turned inwardly to form a track T for the sprocket chain conveyor C. A lower rail 4 is suitably connected to the upper rail by supports such as P so as to form the two truss frames which are spaced apart in parallel relation by a suitable number of cross bars such as B.

As best seen in Fig. 7, the rear of each truss frame is provided with a leg such as 5 suitably braced as indicated at 6, and the lower ends of these leg members are connected together by a pipe 7 welded or otherwise secured thereto and extending a short distance outwardly from the truss frames as shown in Fig. 1. The rear of each truss frame is also provided with a leg such as 8 suitably braced as indicated at 9. A table 10 is bolted to the rear ends of the truss frames as indicated at 11 in Fig. 4 and brace rods such as 12 support the table in angular relation with the truss frames.

A shaft 14 is rotatably mounted at the rear of the truss frames, and a pair of sprockets S are fixed to this shaft and in line with the tracks T—T.

A shaft 15 is rotatably mounted at the forward end of the truss frames, and a pair of flanged wheels E—E are fixed to this shaft and in line with the tracks T—T. As best seen in Fig. 4 this shaft 15 is journaled in bearings such as 16 carried by angle irons such as 17 bolted or otherwise secured on the outside of the truss frames F. A pair of endless sprocket chains 18 are spaced apart by transverse elevator bars such as 19 preferably provided with teeth such as 20. These paired sprocket chains 18 are trained around the sprockets S—S and flanged wheels E—E and travel upon the tracks T—T. The return flight of these chains is supported by a pair of angle iron runners R—R which are secured to the underside of the truss frames F—F. These sprocket chains 18 with their transverse bars 19 constitute an endless conveyor C which must of course be assembled and disassembled as a unit upon the tracks T—T and flanged wheels E—E and sprockets S—S. To accomplish this purpose, the sprockets S are fixed to the shaft 14 which is journaled in bearings 21 slidably mounted in brackets 22 as indicated in Fig. 1 and Fig. 4. This construction enables the sprocket chains 18 to be slacked off so that the links can be opened and the conveyor removed as a unit.

The forward end of this conveyor is supported by a pair of wheels W upon an axle 24 carried by an auxiliary frame D hingedly connected near the front end of the truss frames F—F as indicated in Figures 1, 4 and 7. This auxiliary frame D is separately shown in enlarged detail in Figures 2, 3 and 5 where it will be seen that it consists of two angle iron side rails 25—26 which are spaced apart by dead shafts 27—28 welded or otherwise secured thereto. The horizontal flanges of these angle irons are directed inwardly and the rear ends of their vertical flanges are provided with hinge bolts such as 29 for attachment to the top rails 2 of the truss frames F—F. As best seen in Fig. 2 and Fig. 5, the forward ends of the angle irons 25 and 26 are each provided with an upstanding arm 30 having a series of holes 31 to selectively receive the bolt 32 which passes through the top rail 2 so as to hold the auxiliary frame D at a selected inclination relative to the conveyor frames F—F.

As best seen in Fig. 2 and Fig. 3, the shaft 24 is journaled in bearings such as 33 and held against end play by collars such as 34. Wheel heads 35 and 36 are keyed to the opposite ends of the shaft 24, and a clutch mechanism collectively indicated at X connects the wheel head 36 with a spur gear 37 journaled upon the shaft 24. This clutch X has an operating lever Y carried by a shield Z which is welded or otherwise secured to the angle iron 26 and extends upwardly and outwardly, over the spur gear 37.

As best seen in Fig. 2 this spur gear 37 meshes with a pinion 38 which turns on the dead shaft 27, and the sprocket gear 39 is fixed to this pinion 38 and held against end movement by the bolt 40 which is threaded into the end of the dead shaft 27. A flanged pulley 41 is journaled on the dead shaft 28 and held against end movement by the bolt 42. This flanged pulley 41 is in line with the sprocket wheel 39 and serves as an idler to increase the wrap of a sprocket chain around the sprocket wheel 39.

From this description and an inspection of Fig. 2, it will be seen that when the wheel head 35 is removed, this auxiliary frame D can be readily inserted between the upper and lower rails 2 and 4 of the frames F—F and hingedly bolted to the upper rails by the previously described bolts 29 and 32. This is of considerable advantage in assembly and disassembly, and also enables the axle 24 to be raised or lowered relative to the frames F—F. The wheels W—W are secured to the wheel plates 35 and 36 and furnish traction power for turning the described drive gear.

As shown in Fig. 1 a sprocket chain 43 is trained around the sprocket wheel 39 and then around the sprocket wheel 46 which is keyed to the previously described shaft 14 which carries the sprocket wheels S—S. The upper flight of this sprocket chain 43 is passed under the aforesaid flanged pulley 41 and under a like pulley 44 upon a shaft 45, so as to increase the wrap of the sprocket chain 43 around the sprockets 39 and 46.

From this description, it will be seen that the wheels W—W provide traction power to drive the conveyor C in a direction opposite to the rotation of the wheels W—W.

This conveyor C is slightly wider than the width of a bale of hay, and its forward end is provided with a pair of outwardly flared guides G—G which are secured to the paired truss frames and suitably braced as indicated at b.

Means are provided for detachably mounting the described conveyor so as to travel alongside of an automobile truck. For this purpose, there is provided a pipe M having brackets K—K for bolting to the underside of a platform type of truck such as usually employed for hauling baled hay. A rod L is passed through the previously described pipe 7 and then through this pipe M to which it may be secured in any suitable manner such as by threaded engagement with a head J welded or otherwise secured to the pipe M, or else by a setscrew N, either of which will suffice, and when one is provided, the other may be omitted. From this description it will be seen that the entire device is pivotally mounted on this rod L. Preferably, this rod L is provided with a handle such as H for convenience in withdrawing it from the pipe M, particularly so when the threaded head J is employed.

For connecting the forward end of the conveyor frame to the truck, there is provided a right angle bracket 50 for bolting to the underside of the truck platform. The vertical leg of this bracket is slidably engaged with the conveyor frame by means of a keeper bar 51 which is hinged in spaced relation along the side of the top rail 2 of the conveyor frame so as to provide for free sliding movement of the bracket in the space between the keeper bar and the frame. Preferably this keeper has one end notched out as indicated at 52 so as to form a latch which can be readily lifted so as to disengage the bracket from its keeper, a bolt 53 with a cross stick 54 being employed for convenience of operation.

From this description it will be seen that the invention is attached to the truck in such a position that the truck driver can readily observe the bales as they enter the conveyor, and can readily steer the truck so as to assure proper entrance. When the conveyor encounters a bale, the lowermost crossbar will lift up the end of the bale so that the conveyor can pass under the bale, and then the succeeding crossbars will engage the underside of the bale as it travels up the inclined conveyor to the table 10 where the workman promptly removes each bale and stacks them on the truck.

When the truck becomes loaded, it is desirable to detach the loader and apply it to another truck which can be loading while the first is making the haul. For quickly detaching the loader, the latch 51 is lifted to free the bracket 50, and the rod L is retracted far enough to be free of the pipe M. This necessitates supporting the rear end of the device until it can be connected to another truck. Any suitable means may be employed for supporting the rear end of the conveyor. In the present instance there is shown a caster wheel 55 mounted on a swinging frame 56 which is hinged to the opposite sides of the conveyor frame. This hinged frame 56 is operated by a winch 57 around which there is wound a cable 58 which passes forward over a sheave 59 secured to the underside of the conveyor frame, and this cable then passes rearwardly and is secured to the hinged frame 56 so as to pull the same forwardly against the weight of the conveyor where it is held by a ratchet and pawl such as shown at 60 in Fig. 4. Suitable stop means being provided, this single cable will fully suffice; however, there is also shown a cable 61 which is wound around this same winch for raising the hinged frame and its caster wheel to the position of disuse shown in Fig. 4 where the winch is held by the ratchet and pawl 60.

It will be seen that the same loader can be alternately used on several different trucks, the only necessity being to provide each truck with the bracket 50 and pipe M of the present invention, and of course, these two expedients may remain on the truck permanently, as they are no interference when the truck is used for other purposes.

As shown in Fig. 3 the clutch X is preferably of the ratchet type so as to enable the loader to be backed up without operating the drive mechanism. This is of considerable importance when it is necessary to drive the loader into fence corners and then back out as is sometimes necessary for picking up bales dropped in fence corners and other inconvenient locations. When transporting the hay loader to and from the field, the clutch X can be disengaged by latching the shift mechanism Y as shown in Fig. 3.

It will be seen that the invention provides a strong, light-weight construction which can readily be assembled and disassembled, and which can be quickly and easily transferred from one automobile truck to another without waste of time or effort. Its rear end being fulcrumed on the shaft L, its front end is free to rise and fall according to irregularities in the path of travel, and it is held in parallel relation with the truck by slidable engagement with the bracket 50 which accommodates the vertical movements.

I claim as my invention:

1. A baled hay loader, comprising an inclined conveyor, wheels supporting the forward end of said conveyor, brackets extending downwardly from the rear end of said conveyor, a pipe secured to said brackets and extending transversely of said conveyor, a second pipe having brackets for securing to the underside of a truck, a rod for passing through the first said pipe and into the second said pipe, means for securing said rod in the second said pipe, stop means on the outer end of said rod to hold the first said pipe in pivotal relation therewith, a right angled bracket for attaching to the underside of a truck, means for slidably guiding the forward portion of said conveyor, whereby that portion of the conveyor which is below the underside of the truck is held against lateral movement relative thereto, a drive means turned by said wheels and driving said conveyor in the reverse direction, outwardly flared guide members secured to the lower end of said conveyor for directing bales to enter thereon, and a table supported at the top of said conveyor to receive a bale delivered by said conveyor.

2. A baled hay loader comprising a conveyor frame forwardly supported by a pair of wheels, a pipe secured transversely on the rear of said frame, a second pipe having brackets for securing to the underside of a truck, a rod for pivotally connecting said pipes, a right angle bracket for attachment to the underside of a truck, means for slidably guiding the forward portion of said conveyor frame, whereby that portion of the conveyor which is below the underside of the truck is held against lateral movement relative thereto, an endless conveyor traveling on said frame and driven by said wheels, outwardly flared guide members secured to the forward end of said conveyor frame for directing bales onto said conveyor, and a table supported at the upper end of said frame for receiving each bale delivered by said conveyor.

3. The combination with an automobile truck, of a pipe secured transversely on the underside of the truck, a conveyor frame wheel supported at its forward end and having a pipe secured transversely at its rear end, a lift device for raising the rear end of said conveyor frame so as to align said pipes, a rod for passing through said aligned pipes so as to pivotally connect said conveyor frame to the truck, a right angle bracket secured to the underside of said truck, means for slidably guiding the forward portion of said conveyor frame, whereby that portion of the conveyor which is below the underside of the truck is held against lateral movement relative thereto, an endless conveyor traveling on said frame and driven by said wheels, outwardly flared guide members secured to the forward end of said conveyor frame for directing bales onto said conveyor, and a table supported at the upper end of said frame for receiving each bale delivered by said conveyor.

4. A baled hay loader comprising an inclined conveyor, wheels supporting the forward end of said conveyor, brackets extending downwardly from the rear end of said conveyor, a pipe secured to said brackets and extending transversely of said conveyor, a second pipe having brackets for securing to the underside of a truck, a rod for passing through the first said pipe and into the second said pipe, means for securing said rod in the second said pipe, stop means on the outer end of said rod to hold the first said pipe in pivotal relation therewith, a right angled bracket for attaching to the underside of a truck, and means for slidably guiding the forward portion of said conveyor, whereby that portion of the conveyor which is below the underside of the truck is held against lateral movement relative thereto.

5. A baled hay loader comprising a conveyor frame forwardly supported by a pair of wheels, a pipe secured transversely on the rear of said frame, a second pipe having brackets for securing to the underside of a truck, a rod for pivotally connecting said pipes, means for attachment to the underside of a truck and slidably cooperating with a keeper secured to the forward portion of said conveyor, whereby that portion of the conveyor which is below the underside of the truck is held against lateral movement relative thereto, said means permitting vertical pivoting movement of said conveyor frame, an endless conveyor traveling on said frame and driven by said wheels, outwardly flared guide members secured to the forward end of said conveyor frame for directing bales onto said conveyor, and a table supported at the upper end of said frame for receiving each bale delivered by said conveyor.

HERBERT L. ARMSTRONG.

REFERENCES CITED

The following references are of record in the file of this patent:

UNITED STATES PATENTS

| Number | Name | Date |
| --- | --- | --- |
| 854,734 | Haines | May 28, 1907 |
| 1,406,946 | Eiler | Feb. 14, 1922 |
| 1,570,256 | Hunt | Jan. 19, 1926 |
| 1,989,537 | Wentz | Jan. 29, 1935 |
| 2,335,924 | Elholm | Dec. 7, 1943 |
| 2,367,970 | Smoker | Jan. 23, 1945 |
| 2,402,465 | Templeton | June 18, 1946 |